United States Patent
Seelert et al.

(10) Patent No.: US 10,474,004 B1
(45) Date of Patent: Nov. 12, 2019

(54) BIREFRINGENT PRISM FOR WAVELENGTH SEPARATION

(71) Applicant: Coherent LaserSystems GmbH & Co. KG, Göttingen (DE)

(72) Inventors: Wolf Seelert, Lübeck (DE); Rüdiger Von Elm, Wielen (DE)

(73) Assignee: Coherent LaserSystems GmbH & Co. KG, Göttingen (DE)

( * ) Notice: Subject to any disclaimer, the term of this patent is extended or adjusted under 35 U.S.C. 154(b) by 0 days.

(21) Appl. No.: 16/050,499

(22) Filed: Jul. 31, 2018

(51) Int. Cl.
  *G02B 5/30* (2006.01)
  *G02F 1/37* (2006.01)

(52) U.S. Cl.
  CPC ............. *G02F 1/37* (2013.01); *G02B 5/3066* (2013.01); *G02B 5/3083* (2013.01)

(58) Field of Classification Search
  CPC .......... G02F 1/37; G02F 1/377; G02F 1/3775; G02F 1/383; G02F 2001/372; G02F 2001/374
  See application file for complete search history.

(56) References Cited

U.S. PATENT DOCUMENTS

| | | | |
|---|---|---|---|
| 3,856,380 A * | 12/1974 | Krishnan | G02B 5/3066 359/328 |
| 5,249,196 A | 9/1993 | Scheps | |
| 5,333,142 A | 7/1994 | Scheps | |
| 5,408,481 A | 4/1995 | Scheps | |
| 5,850,407 A * | 12/1998 | Grossman | H01S 3/109 372/22 |
| 5,905,748 A | 5/1999 | Xie | |
| 6,040,942 A * | 3/2000 | Bergmann | G02B 5/3083 359/485.02 |
| 6,229,829 B1 | 5/2001 | Yin | |
| 6,347,102 B1 | 2/2002 | Konno et al. | |
| 6,373,866 B1 | 4/2002 | Black | |
| 6,384,973 B1 * | 5/2002 | Moore | G02B 1/02 359/352 |
| 6,418,154 B1 | 7/2002 | Kneip et al. | |
| 6,424,454 B1 | 7/2002 | Moore | |
| 7,466,728 B2 | 12/2008 | Clubley et al. | |
| 8,837,535 B2 | 9/2014 | Spiekermann et al. | |

(Continued)

FOREIGN PATENT DOCUMENTS

DE 19532440 A1 2/1997

OTHER PUBLICATIONS

Coutts et al., "Production of High Average Power UV by Second-Harmonic and Sum-Frequency Generation from Copper-Vapor Lasers", IEEE Journal of Selected Topics in Quantum Electronics, vol. 1, No. 3, Sep. 1995, pp. 768-778.

(Continued)

*Primary Examiner* — Rhonda S Peace
(74) *Attorney, Agent, or Firm* — Morrison & Foerster LLP

(57) ABSTRACT

An optical ring-resonator converts visible wavelength radiation to ultraviolet wavelength radiation by frequency-doubling the visible wavelength radiation in an optically non-linear crystal. The resonator includes an uncoated birefringent out-coupling prism. The visible wavelength radiation passes through faces of the prism at a Brewster-angle. Ultraviolet wavelength radiation enters the prism, is totally internally reflected, directed out of the prism at a Brewster-angle, and exits the ring-resonator as output radiation.

20 Claims, 3 Drawing Sheets

(56) References Cited

U.S. PATENT DOCUMENTS

| | | |
|---|---|---|
| 9,312,657 B1 | 4/2016 | Von Elm et al. |
| 2006/0171018 A1 | 8/2006 | Galvanauskas et al. |
| 2013/0188663 A1 | 7/2013 | Pang |

OTHER PUBLICATIONS

Non-Final Office Action received for U.S. Appl. No. 14/558,549, dated Aug. 4, 2015, 11 pages.

Notice of Allowance received for U.S. Appl. No. 14/558,549, dated Dec. 30, 2015, 7 pages.

International Search Report and Written Opinion received for PCT Application No. PCT/EP2019/059792, dated Jul. 16, 2019, 11 pages.

\* cited by examiner

BIREFRINGENT PRISM FOR WAVELENGTH SEPARATION

TECHNICAL FIELD OF THE INVENTION

The present invention relates in general to optical elements for separating radiation having two components with different wavelengths. The invention relates in particular to optical elements for coupling ultraviolet wavelength radiation out of a laser resonator for visible wavelength radiation, in which the ultraviolet wavelength radiation is produced by second-harmonic conversion of the visible wavelength radiation.

DISCUSSION OF BACKGROUND ART

In devices for providing ultraviolet (UV) wavelength radiation it is usual to generate the ultraviolet wavelength radiation by harmonic conversion of visible wavelength radiation in an optically nonlinear crystal. Typically, the visible wavelength radiation is generated by second-harmonic conversion of near-infrared (NIR) wavelength radiation, which is generated in a solid-state laser, such as an optically-pumped semiconductor (OPS) laser.

By way of example, in one common arrangement for generating continuous-wave UV radiation, the visible radiation is generated by intra-cavity second-harmonic conversion of fundamental radiation having a wavelength in the NIR region of the electromagnetic spectrum. The visible radiation is coupled into an impedance-matched resonant-enhancement cavity for the visible radiation. An optically nonlinear crystal within the resonant-enhancement cavity converts the visible radiation to UV radiation. Using an OPS laser for the intra-cavity generation of the visible radiation, it is possible to generate UV radiation having a wavelength of 266 nanometers (nm) or less.

Typically, the UV radiation is directed out of the resonant cavity by an optically-coated thin-film dichroic filter. This dichroic filter may serve as one of the resonator mirrors, reflecting the visible radiation and transmitting the UV radiation. Alternatively, the dichroic filter may also be an intra-cavity element, transmitting the visible radiation and reflecting the UV radiation out of the resonator.

A particular limitation of the laser arrangements described above is damage to thin-film optical coatings caused by the UV radiation. This limitation becomes more problematic for shorter-wavelength UV radiation. Further, even a not-yet-damaged coating will typically have losses due to manufacturing variances in layer-thickness or due to absorption by the materials of the coating. Such losses reduce the efficiency of resonators having intra-cavity harmonic generation and ultimately the useful lifetime of these resonators. There is a need for a device to separate UV radiation from visible radiation that does not require any thin-film optical coatings.

SUMMARY OF THE INVENTION

In one aspect, optical apparatus for converting radiation having a fundamental wavelength to radiation having a second-harmonic wavelength comprises an optical resonator in which the fundamental radiation circulates. An optically nonlinear crystal is located in the optical resonator and arranged to convert circulating fundamental radiation to second-harmonic radiation. The fundamental radiation and second-harmonic radiation have mutually-orthogonal linear polarizations. An uncoated birefringent prism is located in the optical resonator and arranged to receive the fundamental radiation and second-harmonic radiation propagating coaxially from the optically nonlinear crystal. The fundamental radiation and second-harmonic radiation are incident on a first face of the prism at about an external Brewster angle for the fundamental radiation. Fundamental radiation transmitted through the prism is incident on a second face of the prism at about an internal Brewster angle for the fundamental radiation. The prism is further arranged such that a portion of the second-harmonic radiation enters the prism through the first face thereof, is totally internally reflected by the second face thereof, is incident on a third face thereof at about an internal Brewster angle for the second-harmonic radiation, and exits the prism through the third face. The fundamental radiation is an extraordinary beam within the prism and the second-harmonic radiation is an ordinary beam within the prism.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
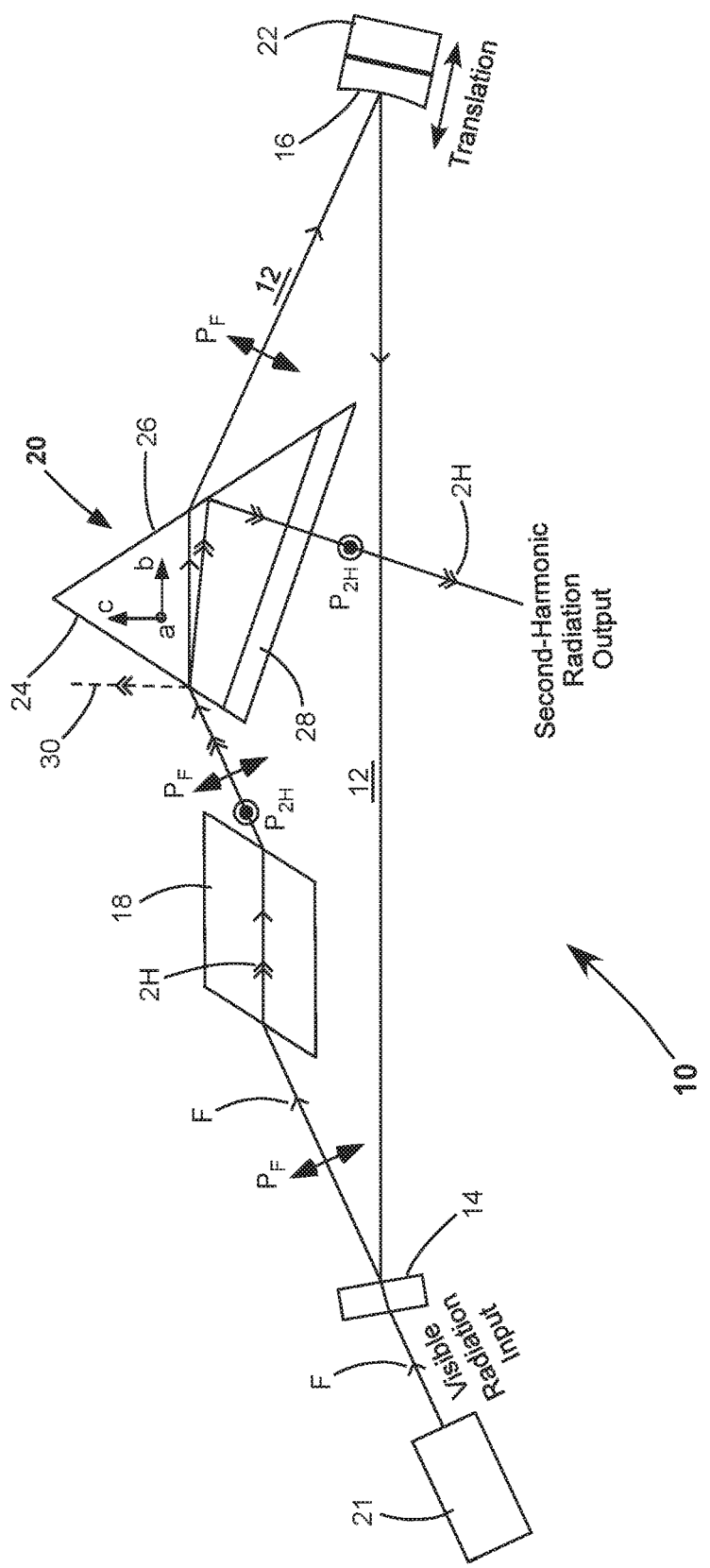
FIG. 1 is a plan view schematically illustrating a unidirectional ring-resonator, configured for harmonic conversion, including an optically nonlinear crystal for converting input visible radiation into UV radiation and including an uncoated birefringent out-coupling prism in accordance with the present invention, arranged to separate the UV radiation from the visible radiation and direct the UV radiation out of the ring resonator, the birefringent prism having negative uniaxial birefringence.

Turning now to the drawings, FIG. 1 schematically illustrates a preferred embodiment 10 of optical apparatus in accordance with the present invention. Apparatus 10 includes an optical resonator 12, which is configured as an enhancement resonator for harmonic conversion. Resonator 12 is a unidirectional ring-resonator formed by a plane mirror 14, a concave mirror 16, a Brewster-cut optically nonlinear crystal 18, and an uncoated birefringent out-coupling prism 20 in accordance with the present invention.

Visible wavelength radiation "F" is coupled into resonator 12 through mirror 14. The visible wavelength radiation is designated hereinafter as the "fundamental radiation", for convenience of description. A source 21 of the fundamental radiation may generate the fundamental radiation by harmonic conversion of NIR radiation, as discussed above. By way of example, source 21 could be a diode-pumped OPS laser generating a beam of laser-radiation. The beam path of the fundamental radiation is depicted having a single arrowhead. The fundamental radiation circulates around resonator 12, directed in turn by mirror 14, optically nonlinear crystal 18, prism 20, and mirror 16.

Mirror 14 is partially transmissive for the fundamental radiation. For example, about 1% transmissive and about 99% reflective. The transmission of mirror 14 is selected to impedance match resonator 12 with the input fundamental radiation. Mirror 16 is maximally reflective for the fundamental radiation. Mirror 16 is continuously translatable by a piezoelectric transducer 22 for maintaining resonator 12 in a resonance condition for the fundamental radiation. Methods for maintaining a resonator "locked" in a resonance condition by translation of a mirror are well-known in the art. These locking methods include the Pound-Drever-Hall method and the Hansch-Couillaud method. A detailed description of any such locking method is not necessary for understanding principles of the present invention, and accordingly, is not presented herein.

The fundamental radiation is linearly-polarized, with a polarization orientation indicated by arrowheads "$P_F$". Optically nonlinear crystal 18 is arranged to generate UV radiation from the fundamental radiation by type-1 second-harmonic conversion. The beam path of the second-harmonic UV radiation "SH" is depicted having a double arrowhead. The second-harmonic radiation is linearly-polarized, with a polarization orientation indicated by arrowheads "$P_{2H}$". The fundamental radiation and second-harmonic radiation have mutually-orthogonal linear polarizations.

Prism 20 includes an input face 24, an output face 26 for fundamental radiation, and an output face 28 for second-harmonic radiation. The crystallographic "a", "b", and "c" axes of the prism are oriented as indicated in the drawing. Faces 24 and 26 are orthogonal to the plane of the drawing and parallel with the a-axis. Output face 28 is non-orthogonally inclined to the plane-of the drawing and is not parallel with the a-axis. In the following description, prism 20 is made of a negative uniaxial birefringent material, having an optic axis parallel to the c-axis. An extraordinary beam within the prism has linear polarization parallel to the c-axis. An ordinary beam within the prism has a linear polarization perpendicular to the c-axis. The refractive index n for a specific beam in prism 20 depends on the wavelength of the beam and whether it is an extraordinary or ordinary beam. In a negative uniaxial birefringent material, the refractive index for an ordinary beam ($n_o$) is larger than the refractive index for an extraordinary beam ($n_e$).

The fundamental radiation and second-harmonic radiation propagate coaxially from the optically nonlinear crystal and are incident on input face 24 of prism 20 at an external Brewster angle for the fundamental wavelength. The fundamental radiation enters prism 20 through input face 24 and is transmitted through the prism. The fundamental radiation is incident onto output face 26 of prism 20 at an internal Brewster angle for the fundamental radiation. The fundamental radiation exits the prism through output face 26. The fundamental radiation is polarized parallel to the plane of incidence (p-polarized) onto both faces 24 and 26. Accordingly, the fundamental radiation is transmitted completely through the prism with very-low reflection losses.

The second-harmonic radiation is polarized perpendicular to the plane of incidence (s-polarized) onto input face 24 and is transmitted into the prism with some reflection loss, as indicated by dashed line 30. Inside birefringent prism 20, the second-harmonic radiation is more steeply refracted than the fundamental radiation, as it experiences a higher refractive index. The second-harmonic radiation is incident on output face 26 at an angle greater than the critical angle for the second-harmonic radiation. This causes total internal reflection of the second-harmonic radiation from output face 26. Output face 28 of the prism is preferably inclined such that the second-harmonic radiation is incident thereon at an internal Brewster angle for the second-harmonic radiation. The second-harmonic radiation is p-polarized with respect to output face 28 and is transmitted out of the prism with negligible loss. The second-harmonic radiation is thereby coupled out of resonator 12 with just the reflection loss indicated by dashed line 30.

A detailed description of the action of prism 20 is set forth below with reference to FIG. 2A and FIG. 2B, with an exemplary birefringent prism made of β-barium borate (BBO) and with exemplary wavelengths of 426 nm and 213 nm for the fundamental radiation and second-harmonic radiation, respectively. In BBO, the refractive index of an extraordinary beam at 426 nm is 1.5650 and the refractive index of an ordinary beam at 213 nm is 1.8284.

Figure 2B:
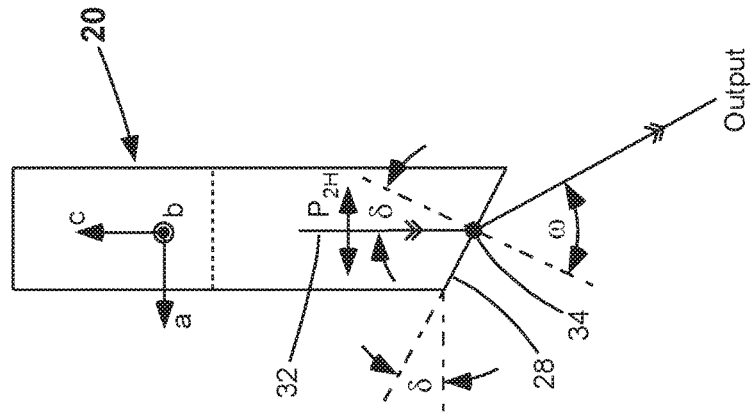
FIG. 2B is a cross-sectional side view of the birefringent prism of FIG. 2A, seen generally in the direction 2B-2B, as indicated in FIG. 2A.
Figure 2A:
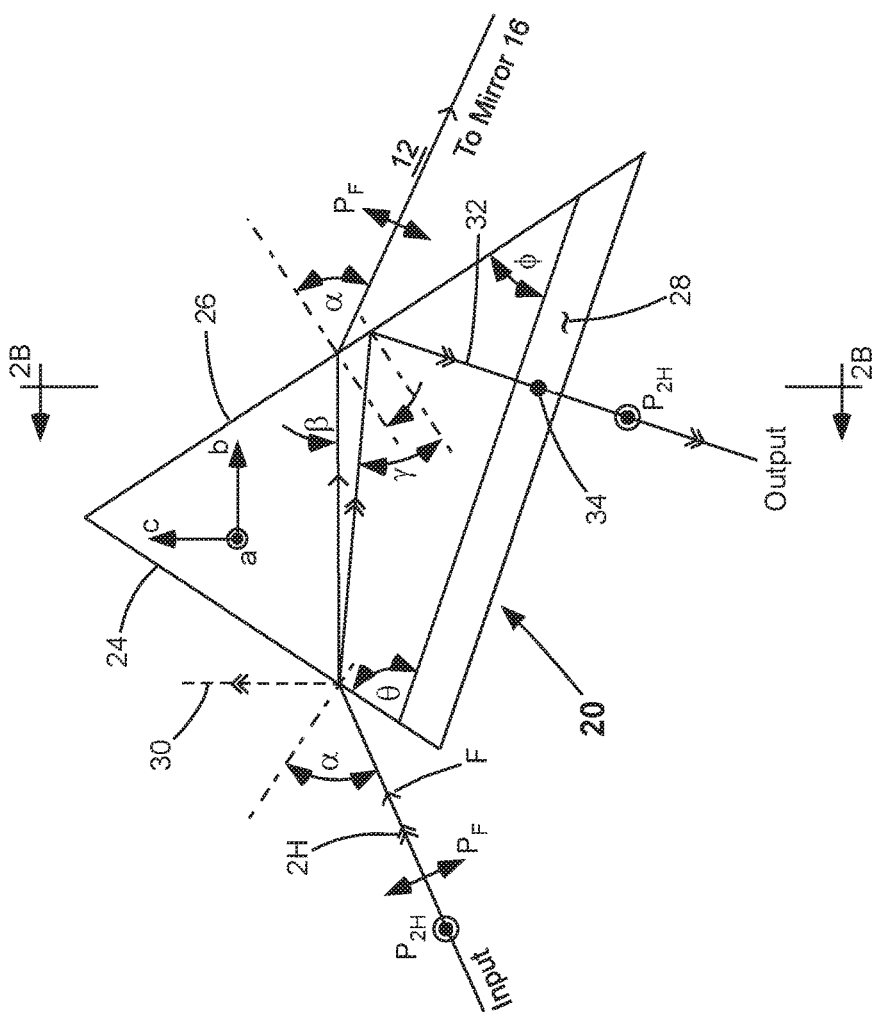
FIG. 2A is a plan view schematically illustrating a preferred embodiment of the inventive birefringent prism of FIG. 1.

Referring first to FIG. 2A, the coaxial fundamental radiation "F" and second-harmonic UV radiation "2H" are incident on input face 24 of prism 20 at an angle α. With the crystallographic axes oriented as depicted, the linearly-polarized fundamental radiation experiences the lower refractive index ($n_e$) of the birefringent prism. The fundamental radiation is p-polarized with respect to input face 24 and angle α is 57.42°, which is the external Brewster angle for an extraordinary beam of 426 nm radiation. Therefore, the fundamental radiation is transmitted into the prism with negligible loss. Within prism 20, the fundamental radiation is an extraordinary beam and propagates parallel to the b-axis of the prism. The fundamental radiation is incident on output-face 26 at an angle β. Angle β is 32.58°, which is the internal Brewster angle for an extraordinary beam of 426 nm radiation. Accordingly, the fundamental radiation is also transmitted through output face 26 with negligible loss.

The second-harmonic radiation is s-polarized with respect to input face 24 and sees the higher refractive index ($n_o$) of the birefringent prism. Therefore, a portion of the second-harmonic radiation will be reflected from input face 24, as indicated by dashed line 30. In the instant example, about 25% of the second-harmonic radiation will be reflected and about 75% transmitted. Within prism 20, the transmitted portion of the second-harmonic radiation is an ordinary beam. At input face 24, the second-harmonic radiation is more strongly refracted than the fundamental radiation. This is due to the higher refractive index ($n_o > n_e$), augmented by dispersion due to the shorter 213 nm wavelength. This stronger refraction causes the second-harmonic radiation to be incident on output face 26 of prism 20 at an angle γ of 37.72°, which is greater than the critical angle of 33.16° for total internal reflection of an ordinary beam of 213 nm radiation. Accordingly, the second-harmonic radiation experiences total internal reflection, thereby directing it along beam path 32 towards output face 28 of the prism.

Referring now to FIG. 2B, angles θ and φ of prism 20 and inclination angle δ of output face 28 with respect to the a-axis are selected such that the second-harmonic radiation is incident on output face 28 at the internal Brewster angle for an ordinary beam. The second-harmonic beam is p-polarized with respect to output face 28 and will be transmitted through output face 28 and out of the prism with negligible loss. The transmitted second-harmonic beam exits from output face 28 at the external Brewster angle ω for an ordinary beam. In the instant example, angles θ and φ are respectively 77.12° and 37.72°. Angles δ and ω are respectively 28.68° and 61.32°. The location 34 where the second-harmonic radiation is incident on output face 28 is indicated by a dot for reference.

It should be noted that an important principle of the present invention is to minimize, if not altogether eliminate, reflection losses for the fundamental radiation in passing through the prism while avoiding the use of optical coatings. Such coatings would eventually degrade through interaction with the second-harmonic UV radiation and, even initially, may be less than 100% efficient. Resonator 12 of FIG. 1 is a very high-Q resonator, for providing strong resonant enhancement of the fundamental radiation and thus providing for efficient second-harmonic conversion. Assuming a low-loss resonator with total internal losses of less than 0.1%, the output coupling of the resonator is mainly through conversion into the second-harmonic radiation, with a conversion efficiency of around 1%. By way of example, an additional loss of as little as 1% for the fundamental radiation caused by coatings could reduce the intra-cavity circulating power by about 50%. This additional loss would reduce the second-harmonic radiation generated by as much as 75%, which is significantly greater than the reflection loss of the second-harmonic radiation at input face 24 of prism 20.

In the description above, the fundamental radiation propagates parallel to the b-axis of the prism and has a polarization orientation parallel to the c-axis of the prism. The fundamental radiation and second-harmonic radiation would also be separated in alternative arrangements having the crystallographic axes rotated about the a-axis, such that the fundamental radiation propagates at an angle with respect to the b-axis. However, the arrangement described and depicted herein is preferred because the fundamental radiation experiences the lowest refractive index ($n_e$), thereby maximizing the angular separation ($\gamma-\beta$) of the fundamental radiation and the second-harmonic radiation.

Figure 3:
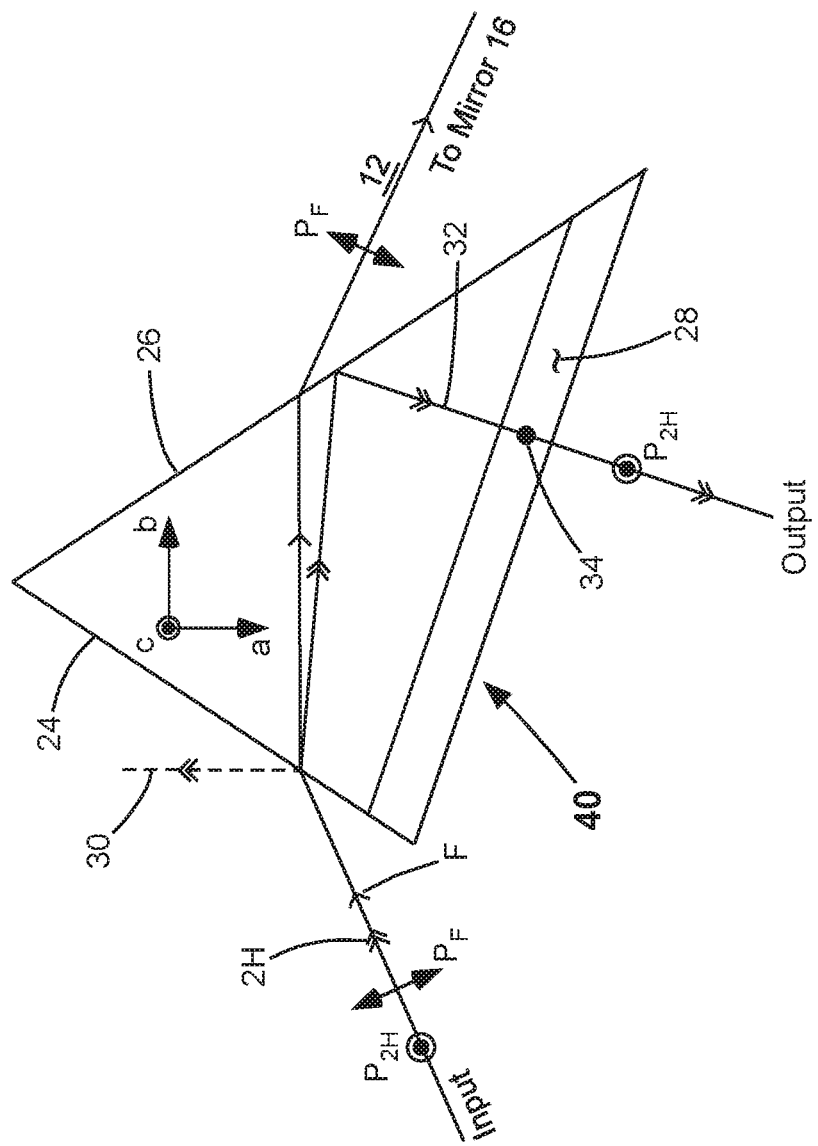
FIG. 3 is a plan view schematically illustrating a preferred embodiment of the inventive birefringent prism, similar to the prism of FIG. 2A, but the birefringent prism having positive uniaxial birefringence.

In the description above, prism 20 is made of a negative uniaxial birefringent material. FIG. 3 schematically illustrates an alternative uncoated birefringent out-coupling prism 40 made of a positive uniaxial birefringent material, wherein the refractive index for an ordinary beam is smaller than the refractive index for an extraordinary beam ($n_o<n_e$). By way of example, vanadate ($VO_4$) is a positive uniaxial birefringent material that is commercially available with high optical quality. Prism 40 is similar to prism 20 in FIG. 2A, with an exception that the crystallographic axes are reoriented. The fundamental radiation and second-harmonic radiation are equally separated in alternative arrangements of prism 40 having the crystallographic axes rotated about the c-axis. As discussed above, relative orientations of the crystal faces and angles of incidence thereon depend on the refractive indices, which are specific to the birefringent material selected.

The present invention is described above with reference to a preferred embodiment, and to a specific numerical example of that embodiment for converting 426 nm radiation to 213 nm radiation. Those skilled in the art, from the description of the present invention provided herein, may devise other embodiments and examples thereof without departing from the spirit and scope of the invention. Those skilled in the art will recognize that the present invention is not limited to use in a passive ring resonator, but may also be incorporated in a resonator having an optical gain medium and/or a may be incorporated into a linear resonator. By way of example, the invention may be used in an active resonator wherein a gain-medium of praseodymium-doped yttrium lithium fluoride (Pr:YLF) generates fundamental radiation having a wavelength of about 522 nm, which is converted by second-harmonic generation in an optically nonlinear crystal to second-harmonic UV radiation having a wavelength of about 261 nm.

An advantage of the present invention is that only the second-harmonic UV radiation is incident on output face 28 of the prism. Although the present invention is depicted and described having uncoated output face 28 inclined at angle δ for transmission of the second-harmonic beam with very-low reflection loss, the output face could instead be configured for normal incidence (δ is 0°) and have an antireflection coating. It is generally easier to fabricate a damage-resistant thin-film optical coating specified for just one wavelength than a dichroic optical coating specified for multiple wavelengths. A coated output face could be configured for other convenient angles of incidence. By way of example, the overall shape of the prism could be an isosceles triangle, with uncoated fundamental input and output faces for the fundamental beam having equal length, and an antireflection coated output face for the second-harmonic UV radiation.

In summary, the present invention is described above with reference to a preferred and other embodiments. The invention is not limited, however, by the embodiments described and depicted herein. Rather, the invention is limited only by the claims appended hereto.

What is claimed is:

1. Optical apparatus for converting radiation having a fundamental wavelength to radiation having a second-harmonic wavelength, comprising:
   an optical resonator in which the fundamental radiation circulates;
   an optically nonlinear crystal located in the optical resonator and arranged to convert circulating fundamental radiation to second-harmonic radiation, the fundamental radiation and second-harmonic radiation having mutually-orthogonal linear polarizations;
   an uncoated birefringent prism located in the optical resonator and arranged to receive the fundamental radiation and second-harmonic radiation propagating coaxially from the optically nonlinear crystal, the fundamental radiation and second-harmonic radiation incident on a first face of the prism at about an external Brewster angle for the fundamental radiation, the fundamental radiation transmitted through the prism and incident on a second face of the prism at about an internal Brewster angle for the fundamental radiation, the fundamental radiation exiting the prism through the second face;
   wherein the prism is further arranged such that a portion of the second-harmonic radiation enters the prism through the first face thereof, is totally internally reflected by the second face thereof, is incident on a third face thereof at about an internal Brewster angle for the second-harmonic radiation, and exits the prism through the third face; and
   wherein the fundamental radiation is an extraordinary beam within the prism and the second-harmonic radiation is an ordinary beam within the prism.

2. The apparatus of claim 1, wherein the optical resonator is a unidirectional ring-resonator.

3. The apparatus of claim 1, wherein the optical resonator is configured as an enhancement resonator for the fundamental radiation.

4. The apparatus of claim 1, wherein the first and second faces of the prism are parallel to a first crystallographic axis of the prism and the third face of the prism is not parallel to the first crystallographic axis.

5. The apparatus of claim 4, wherein the prism is made of a negative uniaxial birefringent material, the fundamental radiation propagating in the prism parallel to a second crystallographic axis of the prism, and the optic axis of the negative uniaxial birefringent material being a third crystallographic axis of the prism.

6. The apparatus of claim 4, wherein the prism is made of a positive uniaxial birefringent material, the first crystallographic axis being the optic axis of the positive uniaxial birefringent material.

7. The apparatus of claim 1, wherein the uncoated birefringent prism is a prism made of β-barium borate (BBO).

8. The apparatus of claim 1, wherein the fundamental radiation has a wavelength of 426 nanometers and the second-harmonic radiation has a wavelength of 213 nanometers.

9. The apparatus of claim 8, wherein the uncoated birefringent prism is a prism made of β-barium borate (BBO).

10. The apparatus of claim 9, wherein the external Brewster angle for the fundamental radiation is about 57.42°, the internal Brewster angle for the fundamental radiation is about 32.58°, and the internal Brewster angle for the second-harmonic radiation is about 28.68°.

11. The apparatus of claim 1, wherein the uncoated birefringent prism is a prism made of vanadate ($VO_4$).

12. The apparatus of claim 1, wherein the fundamental radiation is p-polarized with respect to the first and second faces of the birefringent prism, and the second-harmonic radiation is p-polarized with respect to the third face of the birefringent prism.

13. The apparatus of claim 1, further including an optical gain medium.

14. Optical apparatus for generating radiation having a second-harmonic wavelength, comprising:
 a source generating radiation having a fundamental wavelength;
 a unidirectional ring-resonator arranged to receive the fundamental radiation and cause the fundamental radiation to circulate therein;
 an optically nonlinear crystal located in the optical resonator and arranged to convert circulating fundamental radiation to second-harmonic radiation, the fundamental radiation and second-harmonic radiation having mutually-orthogonal linear polarizations;
 an uncoated birefringent prism located in the optical resonator and arranged to receive the fundamental radiation and second-harmonic radiation propagating coaxially from the optically nonlinear crystal, the fundamental radiation and second-harmonic radiation incident on a first face of the prism at about an external Brewster angle for the fundamental radiation, the fundamental radiation transmitted through the prism and incident on a second face of the prism at about an internal Brewster angle for the fundamental radiation, the fundamental radiation exiting the prism through the second face;
 wherein the prism is further arranged such that a portion of the second-harmonic radiation enters the prism through the first face thereof, is totally internally reflected by the second face thereof, is incident on a third face thereof at about an internal Brewster angle for the second-harmonic radiation, and exits the prism through the third face; and
 wherein the fundamental radiation is an extraordinary beam within the prism and the second-harmonic radiation is an ordinary beam within the prism.

15. The apparatus of claim 14, wherein the first and second faces of the prism are parallel to a first crystallographic axis of the prism and the third face of the prism is not parallel to the first crystallographic axis.

16. The apparatus of claim 15, wherein the prism is made of a negative uniaxial birefringent material, the fundamental radiation propagating in the prism parallel to a second crystallographic axis of the prism, and the optic axis of the negative uniaxial birefringent material being a third crystallographic axis of the prism.

17. The apparatus of claim 15, wherein the prism is made of a positive uniaxial birefringent material, the first crystallographic axis being the optic axis of the positive uniaxial birefringent material.

18. The apparatus of claim 14, wherein the uncoated birefringent prism is a prism made of β-barium borate (BBO).

19. The apparatus of claim 18, wherein the fundamental radiation has a wavelength of 426 nanometers and the second-harmonic radiation has a wavelength of 213 nanometers.

20. The apparatus of claim 14, wherein the uncoated birefringent prism is a prism made of vanadate ($VO_4$).

* * * * *